(12) United States Patent
Goldstein

(10) Patent No.: US 9,578,164 B2
(45) Date of Patent: *Feb. 21, 2017

(54) METHODS AND SYSTEMS FOR VOICE AUGMENTED CALLER ID / RING TONE ALIAS

(71) Applicant: Steven Wayne Goldstein, Delray Beach, FL (US)

(72) Inventor: Steven Wayne Goldstein, Delray Beach, FL (US)

(73) Assignee: Personics Holdings, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,133

(22) Filed: Oct. 19, 2015

(65) Prior Publication Data

US 2016/0044164 A1 Feb. 11, 2016

Related U.S. Application Data

(63) Continuation of application No. 14/493,270, filed on Sep. 22, 2014, now Pat. No. 9,167,082.

(60) Provisional application No. 61/880,963, filed on Sep. 22, 2013.

(51) Int. Cl.
| | |
|---|---|
| H04M 1/56 | (2006.01) |
| H04M 15/06 | (2006.01) |
| H04M 1/00 | (2006.01) |
| H04M 3/42 | (2006.01) |
| H04W 4/12 | (2009.01) |
| H04M 1/725 | (2006.01) |
| H04N 7/14 | (2006.01) |
| H04M 1/57 | (2006.01) |
| H04W 88/02 | (2009.01) |

(52) U.S. Cl.
CPC ......... *H04M 3/42051* (2013.01); *H04M 1/576* (2013.01); *H04M 1/7255* (2013.01); *H04M 1/72555* (2013.01); *H04M 3/42059* (2013.01); *H04N 7/141* (2013.01); *H04W 4/12* (2013.01); *H04M 1/57* (2013.01); *H04W 88/02* (2013.01)

(58) Field of Classification Search
CPC .......... H04M 1/575; H04M 1/57; H04M 3/42; H04M 1/56; H04M 19/04; H04M 19/041
See application file for complete search history.

(56) References Cited

U.S. PATENT DOCUMENTS

| | | | |
|---|---|---|---|
| 6,044,148 | A | 3/2000 | Bleile |
| 6,590,965 | B1 | 7/2003 | Poole et al. |
| 6,697,470 | B2 | 2/2004 | McDonough |
| 6,748,058 | B1 | 6/2004 | Bell et al. |
| 6,766,004 | B1 | 7/2004 | Chiloyan |
| 6,944,277 | B1 | 9/2005 | Vikki |
| 6,970,906 | B1 | 11/2005 | Parsons et al. |
| 7,162,027 | B1 | 1/2007 | Cannon et al. |
| 8,073,121 | B2 | 12/2011 | Urban et al. |

(Continued)

*Primary Examiner* — Quoc D Tran
(74) *Attorney, Agent, or Firm* — Pablo Meles

(57) ABSTRACT

A communication device and method can include one or more processors operatively coupled to memory and an audible output device, where the one or more processors receive a call from a calling party that includes a voice or video message associated, presenting the voice message or video message as an alias of or to a ring tone or interleaved with the ring tone before the call from the calling party is answered or rejected. Other embodiments are disclosed.

20 Claims, 2 Drawing Sheets

100
Telephone Call with Ring Tone Voice Alias

(56) References Cited

U.S. PATENT DOCUMENTS

| | | | |
|---|---|---|---|
| 8,391,445 B2 | 3/2013 | Hoblit et al. | |
| 8,494,125 B2 | 7/2013 | Burg et al. | |
| 9,167,082 B2* | 10/2015 | Goldstein | H04M 3/42051 |
| 9,172,794 B2* | 10/2015 | Goldstein | H04M 3/42051 |
| 2002/0172338 A1 | 11/2002 | Lee et al. | |
| 2003/0032415 A1 | 2/2003 | Cho et al. | |
| 2003/0086558 A1 | 5/2003 | Seelig et al. | |
| 2004/0258220 A1 | 12/2004 | Levine et al. | |
| 2007/0140219 A1 | 6/2007 | Diroo et al. | |
| 2007/0297587 A1 | 12/2007 | Urban et al. | |
| 2009/0089716 A1 | 4/2009 | Chen et al. | |
| 2009/0310766 A1 | 12/2009 | Ye | |
| 2011/0219018 A1 | 9/2011 | Bailey et al. | |

* cited by examiner

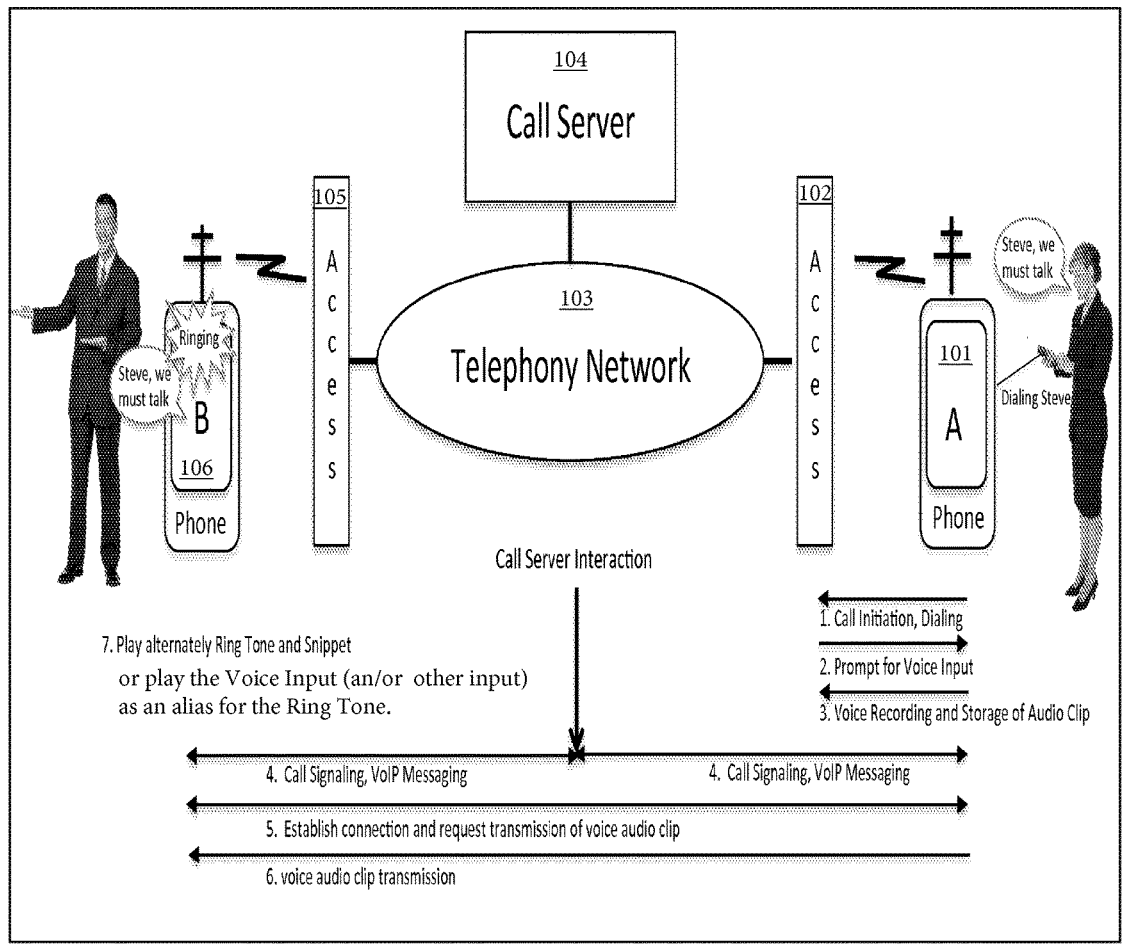
Figure 1: Telephone Call with Ring Tone Voice Alias

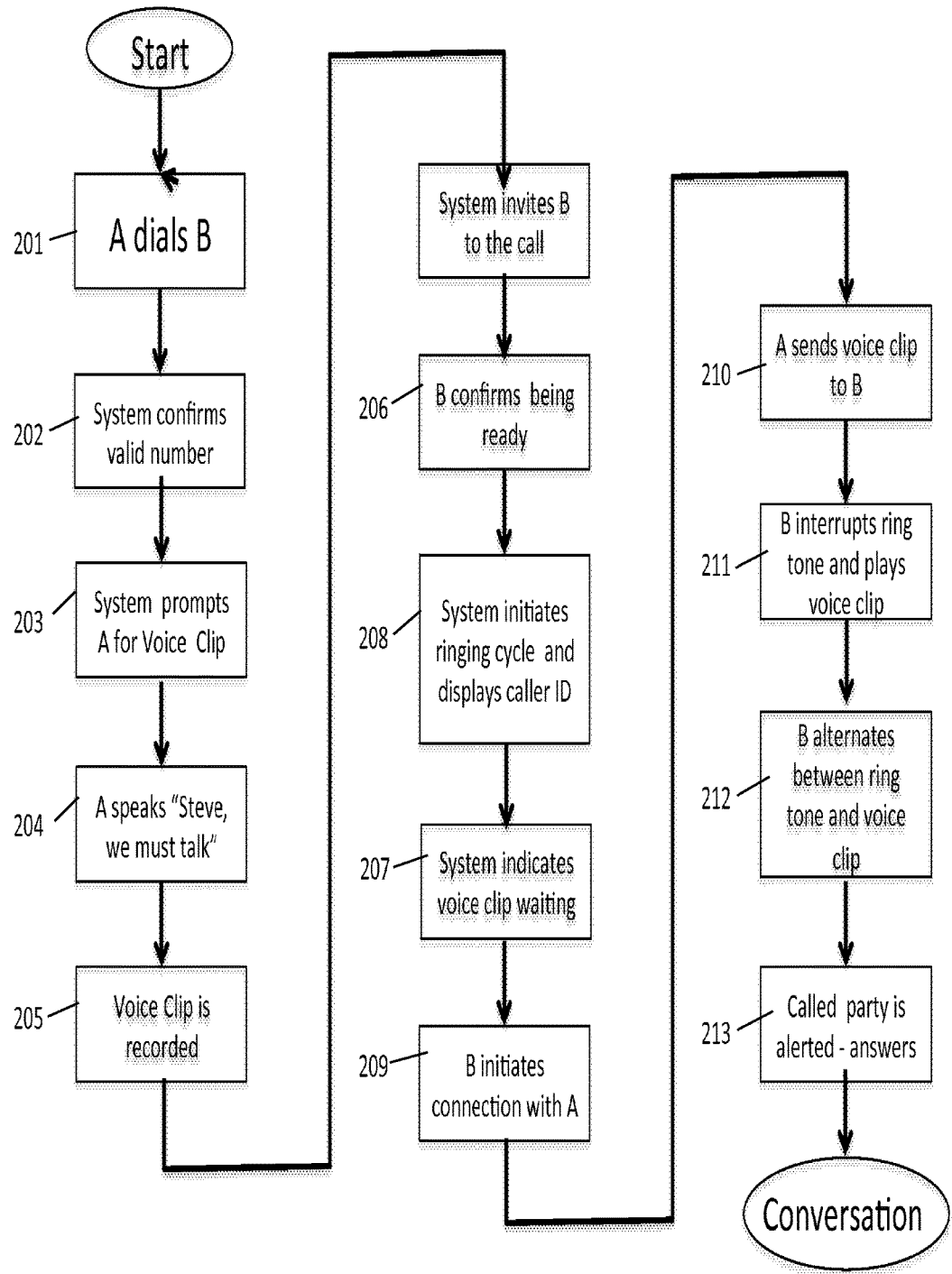
Figure 2: Example Call Flow as illustrated in Fig. 1

METHODS AND SYSTEMS FOR VOICE AUGMENTED CALLER ID / RING TONE ALIAS

CROSS REFERENCE TO RELATED APPLICATIONS

This Application is a Continuation Application of U.S. patent application Ser. No. 14/493,270 filed Sep. 22, 2014 and which claims the priority benefit of Provisional Patent Application No. 61/880,963 entitled "Methods and Systems for Voice Augmented Caller ID/Ring Tone Alias" filed on 22 Sep. 2013, the entire contents of which are all incorporated herein by reference in their entireties.

FIELD

The embodiments herein generally disclose methods and systems for caller identification in modern communications technologies. Application of the embodiments can apply to all forms mobile and non-mobile forms of communications devices including wearable and body-borne computing. Some embodiments incorporate voice or audio clips in the caller identification procedure during a call setup of a telephone call.

BACKGROUND

Speech signals include information about the creator of the speech. It is well researched that humans can identify individuals from their voice, suggesting providing the existence of a perceptual representation of voice identity. The spoken word contains information about: who is calling as well as the emotional state of the speaker; it can signal happiness, dissatisfaction, urgency, anger, stress, and many more conditions reflective of the state of mind of the speaker. Additionally gender, age, ethnicity and nationality can also be discovered by one's voice.

BRIEF DESCRIPTION OF THE FIGURES

The embodiment and the following detailed description of certain embodiments thereof may be understood by reference to the following figures:

FIG. 1 depicts a network scenario of party A (the calling party) calling party B (the called party) and submitting a voice audio clip to be played at the B party device during the ringing cycle in accordance with the embodiments;

FIG. 2 depicts the action and call flow for the illustration in FIG. 1 in accordance with the embodiments.

DETAILED DESCRIPTION

In today's telephony communication systems information about who is calling as well as the emotional state of the speaker as well as gender, age, ethnicity and nationality is not available to the recipient (called party) of a phone call during the call setup phase (telephony signaling protocol terminology), that is during the ringing phase of the arriving call before the call is answered.

If a voice or speech or audio clip of the calling party were presented during the ringing phase, the called party would be able to potentially identify and recognize a speaker from memory who is calling and obtain an impression of the caller's state of mind or the potential subject matter of the upcoming call and therefore be able to make a better-educated decision whether to answer the call. For example, consider a case whereby the called party is engaged in a business meeting and a call arrives from his or her spouse, a few seconds of a calling party's voice could reflect a possible stress situation of the spouse that would require the immediate attention of the called party. Conceivably there are many other situations where the receiving party (recipient or called party) could benefit from hearing a voice sample of the calling party without the need to look at or to touch the communication device before the call is actually answered.

Referring to FIG. 1, a system 100 in accordance with an embodiment can initiate a call from Party A to Party B using a calling party's phone or device 101 to dial and initiate a call to the called party's device 106. The device 101, for example, can connect to the device 106 via an access point 102 within range of the device 101, a telephony network 103 using a call server 104, and an access point 105 within range of the device 106. The telephony network, access points, and devices can be part of a wired system, a wireless system or a combination of both. The interaction at the call server 104 in such an example can include: 1) receiving the call initiation as a result of the calling party dialing the called party's phone number; 2) sending a prompt to the calling party for a voice input (or other input such as a picture or video of the calling party); 3) recording and storing of the voice input (and/or other input); 4) providing call signaling to one or both of the called party and calling party; 5) establishing a connection and requesting transmission of a voice input or audio clip (and/or other input); 6) transmitting the voice input (and/or other input) to the called party's device 106; and 7) playing the voice input (and/or other input) at the called party's device as an alias for a ring tone or play the voice input (and/or other input) alternately with the ring tone until the called party answer's their device (106) or rejects the call.

Furthermore, the calling party could transmit a still photo or video to the called party instead of or in addition to the voice clip.

Most telephony service providers today offer caller-ID services for telephone users. These services enable a user to identify the name and/or the phone number of the caller before choosing to accept the call. It would be a significant enhancement to the telephone communications functionality if the presented caller-ID were either accompanied by a voice audio clip of the caller and played by acoustic transducers at the called party's communication device as an alias for the ring tone or interleaved with the ringing tone before the called party answers the call. Further note, in some embodiments, the message (whether voice or video) can be recorded at the time of the call origination. In some embodiment, the message (voice or video) can be pre-recorded at some point before the call origination. In yet another embodiment, the voice message or video message can be captured and presented live or virtually live and presented live to the called party. In any event, the voice or video message in some embodiments is "obtained" or retrieved or selected at the time of the call origination. In other words, "obtaining" the voice or video message means that the message is being currently retrieved from a previous recording, obtained from a current recording, or currently streamed to the called party.

Caller identification is a telephony feature that is widely deployed by telephony service providers. The call feature server or telephony switching system obtains and sends the caller identification (of the calling party) to the call receiving device (called party) during the call setup and ringing phase and is subsequently displayed on the communication device of the called party. In particular mobile phones have the ability and are programmed to receive the caller ID in form of a protocol message and display the calling name and number during the ringing cycle. This is standard behavior for today's generation of mobile phones or cell phones, which are connected over a Radio Access Network (RAN) or via VoiP protocols. The call server or switching system delivers the caller ID information either by encoding the information in a VOiP protocol, or over the RAN protocol. The mobile device upon receiving the caller ID information includes the data in the call announcing screen during the ringing cycle.

Some embodiments herein create an opportunity for the calling party to obtain a voice audio clip that is transported over the telephony network or internet to the called party during the call setup phase and which is replayed at the called party's device as a stand alone ring tone alias or interleaved with the ring tone of the incoming call. The microphone built into a phone or other enables the typical capture of the voice clip.

In another embodiment, the calling party hears an audible ring-back tone and then (experiences) what they perceive as their call being answered, and thus begins to speak. During the initial speaking phase, the calling party's audio (captured by a microphone at the calling party's device, for example) is actually being played back to the called party device even thought the called party hasn't yet physically answered their phone. The called party can either choose to answer the phone and engage/continue the conversation, or ignore the calling party's message. If answered, the calling party and optionally the called party would receive an indicator that the live voice conversation is ready to ensue and then the live conversation between the calling party and called party would ensue. The indicator that the live voice conversation is ready can be a text message, iconic symbol, a light, a tactile alert or an auditory signal indicative of the live message.

In another embodiment, the calling party could hear a message and or unique sound or other form of indicator (as described above including text, iconic, light, tactile, auditory, etc.) advising them that the called party's phone is playing their audio but that the called party hasn't accepted the calling party's call.

In another embodiment, the calling party audio clip could be sent to an earphone thus allowing the called party to discreetly audition the calling party's voice clip.

In another embodiment, the calling party may use this feature to convey a short message to remind, or otherwise covey to the called party an action that should or shouldn't take place. In one example, a child could simply verbalize to their parent or other caregiver/friend that they are going to a friend's house after school. In this scenario, the called party could hear the child's voice and decide if they need to take action or not. In a manner, this service operates as an alert with personalized information incorporated into in. The personalized information could be audio, photo, video or text. In other words, the calling party can modify the ring tone heard by the called party. This modification could comprise replaying a voice message played by the calling party.

In another embodiment, the calling party would hear or otherwise be texted a message confirming that their voice/audio message was played (auditioned) and otherwise that the called party was available and/or on the called party's device.

In another embodiment, the calling party could utilize speech, voice or other forms of audio to be sent over an email system, which are then played automatically on the recipient's phone.

In another embodiment, the calling party could utilize speech, voice or other forms of audio to be sent over a text system, which are then played automatically on the recipient's phone.

In another embodiment, a photo or video clip that the calling party posts, is presented during the ringing phase as an alias of the ring tone, and the called party would then be able to potentially identify and recognize the calling party from the still photo or video clip and therefore be able to make a better-educated decision whether to answer the call.

In another embodiment, depending on the characteristics of the caller ID, the call can be automatically rejected, or routed to a different number (including answer message associated with this class of caller ID). Examples of characteristics that can be analyzed from the voice or video message (and/or caller ID if a pre-existing profile or retrievable profile exists) include: age, nationality, ethnicity, or temperament, of the calling party. Methods, systems, and apparatus, including computer programs encoded on a computer storage medium, are described for collecting, transporting and replaying a voice audio clip of a caller obtained (retrieved or recorded or streamed to) at the time of initiating a telephone call, at the called party's communication device interleaved with the ring tone and in addition to displaying caller-ID. Note, the embodiments herein are distinguishable from retrieving pictures or other data stored in association with a called party's phonebook or contact book when detecting a caller ID.

In some embodiments, the method can be realized for packet switching systems or circuit switching systems or both packet and circuit switching systems.

In an embodiment and referring to FIG. 2, after the caller or calling party A dials the called party B at 201 and the system confirms party B's number as a valid number at step 202, the calling party is prompted during the call setup phase to submit a brief voice audio clip directed to the called party at step 203. The calling party provides an input (e.g., "Steve, we must talk") at 204 and the voice audio clip is recorded and stored by the originating device at step 205. The system can invite the called party to the call and the called party can confirm being ready at 206. At the point of the call setup procedure, when the called party device is instructed to apply ringing (at step 208), a new indication in the ringing message (at step 207) will inform the called party device that a voice package is waiting for delivery. The called party device then may establish a speech connection (at step 209) with the calling party device, which is used to transport the voice audio clip to the called party device (at step 210). The receiving device then may interrupt the ring tone and play the voice clip as an alias for the ring tone at step 211 or alternatively interleave the ringing tone with the voice content of the transported voice audio clip and play the voice content over the devices speaker system (at step 212). At 213, the called party is alerted and can optionally answer before a phone conversation ensues.

In some embodiments, the voice audio clip may be obtained through a 2-stage call initiation procedure and stored in computer storage memory of the switching system or one of its dedicated storage systems. This specifically applies to scenarios where the originating device lacks intelligence or memory for storing a voice audio clip.

In some embodiments, the voice audio clip may be encoded in telephony messages and protocols and transported to the called device as part of the call setup procedure, and be replayed by the receiving device during the ringing cycle interleaved with the ringing tone in addition to the caller ID notification display. The voice audio clip may be replayed either before or during the ringing cycle.

In an embodiment, a method includes modification of the telephony call setup protocols comprising:
  a) Notification of the called party that in addition to applying ringing a voice packet is waiting for retrieval (207).
  b) Establishing a transport connection for the voice audio clip (209).
  c) Establishing a session with the caller of a phone call to obtain and store the voice audio clip in computer memory (203).

In an embodiment, a method includes identifying a caller associated with an incoming call from an originating telecommunications device and displaying the calling number and/or name at the called device.

Methods and systems disclosed herein provide for a telephony protocol expansion to include the collection, transport, and delivery of a callers voice audio clip to the called party interleaved with the ring tone.

The features of the embodiments, which are believed to be novel, are set forth with particularity in the appended claims. The embodiments may best be understood by reference to the following description, taken in conjunction with the accompanying drawings.

While the specification concludes with the claims defining the features of the invention that are regarded as novel, it is believed that the embodiments may be better understood from a consideration of the following description in conjunction with the drawings figures, in which like reference numerals are carried forward.

The terms and phrases used herein are not intended to be limiting but rather to provide an understandable description of the invention.

The terms "a" or "an", as used herein, are defied as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

As described above, FIG. 1 illustrates one exemplary embodiment of the system for obtaining, storing, transporting, and replaying audio clips at the called device of a telephone call. Calling party A dials called party B and provides a voice audio clip in a 2-stage call initiation (First: Dialing, Second: Speaking), By design, the illustration in FIG. 1 does not necessarily depict photos, videos, or other metadata, but various embodiments can include such various inputs indicative of the caller or calling party attempting to reach the called party.

FIG. 2 provides a flow chart of individual steps that lead to the delivery of a voice audio clip to party B interleaved with ringing and caller ID display.

Example embodiments of the present invention are described herein in the context of systems, methods and computer program products for obtaining, recording, transporting, and playing back audio clips of a short duration (e.g. 5 sec). A telephony subscriber in the process of making a call may be prompted to provide a voice audio clip destined for the called party (203). The resulting audio clip may be stored either on the caller's device or in computer memory of a switching system. Telephony protocols and signaling technologies are modified to transport (209,210) the voice audio clip to the called party during the call setup phase. Upon receiving the audio clip, the called party may interleave ringing tones and the audio clip content during the ringing cycle (212) of the system, and in addition to the display of caller ID information (208).

In one exemplary embodiment, the voice audio clip may be obtained from the caller of a telephone call (203). After the caller has input the destination telephone number and after validation of the number by the switching systems (202) the caller may be prompted to submit an audio clip intended for the called party (203). The clip may be temporarily stored in local memory of the device or in computer storage memory of the switching systems or in a dedicated adjunct server.

In one exemplary embodiment, when the destination device (at the called party) or an access system for the destination device is instructed to initiate a ringing cycle, a new telephony protocol element (message or signal) may inform the destination device or its access system that an audio clip is waiting to be delivered to the destination device (207). In response, the destination device or its access system may initiate a transport connection (209) to the calling device or to the system where the audio clip is stored and receive the clip over the established transport connection (210). Upon receiving the audio clip the destination device or its access system may replay the clip repeatedly as an alias for the ringtone or may replay the clip and interleaved with the ring tone until the called party answers or rejects the call.

In one exemplary embodiment, the maximum duration for the voice audio clip may be administrable.

Some embodiments can include methods, systems, and apparatus, including computer programs encoded on a computer storage medium, for collecting and transporting a voice audio clip of a telephony caller acquired at the time of initiating a telephone call, and playing the voice audio clip at the called party's communication device before the call is answered or interleaved with a ringing tone and in addition to caller-ID notification, including:
  a. Updating telephony signaling and packet protocols for notification, collection, and transport of telephony caller originated voice audio clip(s).
  b. Storing telephony caller originated voice audio clips at the caller's communication device or at a component of the connecting switching systems
  c. Updating telephony operational procedures for the establishment of a communication session with the originator of a telephone call to obtain a voice audio clip.
  d. Updating telephony operational procedures for retrieval and transport of a caller originated voice audio clip.
  e. Updating telephony procedures for the replay of a voice audio clip at the communication device of a called party.
  f. Modifying the ringing operation at the called party device or its access system to receive a voice audio clip without a ringing tone in a repeating cycle until the associated call is answered or rejected.
  g. Modifying the ringing operation at the called party device or its access system to interleave a received voice audio clip with a ringing tone in a repeating cycle until the associated call is answered or rejected.

Some embodiments include methods, systems, and apparatus, including computer programs encoded on a computer storage medium, for collecting and transporting a voice audio clip of a telephony caller acquired at the time of initiating a telephone call, and transporting a still photo and or video at the called party's communication device before the call is answered or interleaved with a ringing tone and in addition to caller-ID notification, comprising:

a. Updating telephony signaling and packet protocols for notification, collection, and transport of telephony caller originated still photo and or video clip.
b. Storing telephony caller originated still photo and or video clips at the caller's communication device or at a component of the connecting switching systems
c. Updating telephony operational procedures for the establishment of a communication session with the originator of a telephone call to obtain a still photo and or video.
d. Updating telephony operational procedures for retrieval and transport of a caller originated still photo and or video.
e. Updating telephony procedures for the replay of a still photo and or video at the communication device of a called party.
f. Modifying the ringing operation at the called party device or its access system to receive a still photo and or video without a ringing tone in a repeating cycle until the associated call is answered or rejected.
g. Modifying the ringing operation at the called party device or its access system to interleave a received still photo and or video with a ringing tone in a repeating cycle until the associated call is answered or rejected.

In some embodiments, methods, systems, or devices can have a maximum duration of the voice audio clip that is administrable. The methods and systems above can also apply to packet switched or circuit switched telephony or both. In some embodiments, permission for which parties are able to update the telephony signaling and packet protocols is given automatically by an analysis of the called parties address book. In some embodiments, permission for which parties are able to update the telephony signaling and packet protocols is given manually the called party. In some embodiments depending on the characteristics of the calling ID, the call can be automatically rejected, or routed to a different number (including answer message associated with this class of caller ID). Examples of characteristics include: age, nationality/ethnicity, or temperament of the calling party.

In some embodiments a communication device can include an audible output device, a memory having computer instructions, and one or more processors operatively coupled to the memory and the audible output device. The execution of the computer instructions can cause the one or more processors to perform operations including: receiving a call from a calling party that includes caller identification information and a voice or video message associated with the caller identification information; presenting the caller identification information; and presenting the voice message or video message as an alias to a ring tone or interleaved with the ring tone before the call from the calling party is answered. In some embodiments, the communication device is a mobile phone. In some embodiments, the communication device is one among a landline phone, a desktop computer, a laptop computer, a notebook computer, a tablet computer, or a phablet computer. It can also be a smart phone, a smart watch, an earphone, or a body worn computer or wearable computing device as further defined below.

In some embodiments, the voice or video message is a recorded voice or recorded video message retrieved or obtained or recorded at the time of initiating the call to the called party by the calling party. In some embodiments, the one or more processors presents the voice message obtained at the time of initiating the call to the called party by the calling party as the alias for the ring tone presented at the audible output device for the communication device. In some embodiments, the one or more processors presents the voice message obtained at the time of initiating the call to the called party by the calling party interleaved with the ring tone presented at the audible output device for the communication device. In some embodiments, a display coupled to the one or more processors presents the video message obtained at the time of initiating the call to the called party by the calling party as the alias for the ring tone presented at the communication device when receiving the call from the calling party. In some embodiments, the audible output device and a display coupled to the one or more processors presents the video message obtained at the time of initiating the call to the called party by the calling party interleaved with the ring tone presented at the communication device.

In some embodiments, the communication device further includes a display coupled to the one or more processors wherein the video message is a photograph taken (or retrieved or otherwise obtained) at the time of initiating the call to the called party by the calling party which is presented as the alias for the ring tone at the communication device when receiving the call from the calling party. In some embodiments, the communication device further includes a display coupled to the one or more processors wherein the recorded video message is a photograph retrieved or obtained or taken at the time of initiating the call to the called party by the calling party which is presented with the ring tone at the communication device in a repeating cycle when receiving the call from the calling party until the call is answered or rejected.

In some embodiments, the one or more processors analyze the characteristics of the caller identification information and the voice message or the video message and routes the message based on the analysis.

In some embodiments, a method at a communication device can include receiving a call from a calling party that includes caller identification information and a voice or video message associated with the caller identification information; presenting the caller identification information via a presentation device operatively coupled to the communication device; and presenting via the presentation device the voice message or video message as an alias to a ring tone or interleaved with the ring tone or presented with the ring tone in a repeating cycle until the call from the calling party is answered or rejected. In some embodiments, the presentation device is a speaker, a display, or both. In some embodiments, the voice or video message is retrieved or recorded or otherwise obtained at the time of initiating the call to the called party by the calling party.

In some embodiments, the method presents the voice message retrieved or recorded or otherwise obtained at the time of initiating the call to the called party by the calling party as the alias for the ring tone presented at the presentation device for the communication device. In some embodiments, the method presents a voice message obtained at the time of initiating the call to the called party by the calling party interleaved with the ring tone or presented in the repeating cycle at the presentation device for the communication device. In some embodiments, the method analyzes the characteristics of the caller identification information and the voice message or the video message and routes the message based on the analysis.

In some embodiments, a system for communicating with a communication device that presents a ring tone and caller identification information includes a memory having computer instructions and one or more processors operatively coupled to the memory. The execution of the computer instructions causes the one or more processors to perform operations including originating a call from a calling party to a called party that includes caller identification information and a message having a voice message, or video message or photograph associated with the caller identification information obtained at a time of the call origination; and transmitting the caller identification information and the message to the called party for presentation at the communication device of the called party. In some embodiments, the caller identification information and the message is presented at the communication device of the called party as an alias to the ring tone or interleaved with the ring tone or presented with the ring tone in a repeating cycle until the call from the calling party answers or rejects the call. In some embodiments, the system is a telephone communication system for a landline or a mobile phone. In some embodiments, the one or more processors analyze the characteristics of the caller identification information and the message and routes or rejects the message based on the analysis.

The system can be housed in any type of Wearable/Body-Borne computing. The system can further represent a single device or family of devices configured in a master-slave, master-master arrangement for example in an smartphone, smart watch or optical head-mounted display connected physically, optically or wirelessly to a either another Wearable/Body-Borne computer or an earpiece that may or may not contain a microphone or bone conduction pickup.

Wearable and Body-Borne Computing can include: The field of wearable computing, however, extends beyond devices worn only outside the body. "Body-Borne Computing" or "wearable computing" is used as a substitute for "Wearable Computing" so as to include all manner of technology that is on or in the body, e.g. implantable devices as well as portable devices like smartphones.

A term that refers to computer-powered devices or equipment that can be worn by a user, including clothing, watches, glasses, shoes and similar items. Wearable computing devices can range from providing very specific, limited features like heart rate monitoring and pedometer capabilities to advanced "smart" functions and features similar to those in smartphones, smart watches, optical head-mounted displays and helmet-mounted displays. These more advanced wearable computing devices can typically enable the wearer to take and view pictures or video, hear audio signals, read text messages and emails, respond to voice commands, browse the web and more.

Acoustic transducers can include: acoustic, bone conduction, transdermal, magnetic, optical, Electromagnetic Acoustic Transducer (EMAT), Piezoelectric, Magnetostrictive transducers. These transducers in general can either make contact or be used in a non-contact arrangement such as with omnidirectional Transducers or directional transducers).

Microphones constitute: An acoustic-to-electric transducer or sensor that converts sound or vibrations into an optical or electrical signal. Microphones use electromagnetic induction (dynamic microphone), capacitance change (condenser microphone), piezoelectric generation, or light modulation to produce an electrical voltage signal from mechanical vibration. Microphones can also include an ear canal microphone, which is capable of capturing a voice directly from the user ear canal. These are often referred to as bone conduction microphones.

Bone conduction is the conduction of sound to the inner ear through the bones of the skull. Bone conduction transmission can be used with individuals with normal or impaired hearing.

Earphones can include: Earphones, canal phones, and headphones that can be mono or stereo as well as binaural. In addition, the term applies to hearing aids such as Behind The Ear (BTE devices). Earphones can also include in Concha, inn Canal or personal sound amplification products or PSAP's (assisted listening devices). An Earphone may also be considered an electrode array, which is a group of electrodes that collects the impulses from the stimulator and sends them to different regions of the auditory nerve.

Those with ordinary skill in the art may appreciate that the elements in the figures are illustrated for simplicity and clarity and are not necessarily drawn to scale. For example, the dimensions of some of the elements in the figures may be exaggerated, relative to other elements, in order to improve the understanding of the present invention.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A communication device, comprising:
    a audible output device;
    a memory having computer instructions; and
    one or more processors operatively coupled to the memory and the audible output device, the execution of the computer instructions causing the one or more processors to perform operations comprising:
        receiving signaling of a call from a calling party that includes a voice or video message;
        presenting the voice message or video message as an alias of a ring tone or interleaved with the ring tone before the call from the calling party is answered or rejected by a called party device; and
        analyzing the voice message or the video message and routing the message based on the analysis.

2. The communication device of claim 1, wherein the communication device is a mobile phone.

3. The communication device of claim 1, wherein the communication device is one among a landline phone, a desktop computer, a laptop computer, a notebook computer, a tablet computer, or a phablet computer.

4. The communication device of claim 1, wherein the voice or video message is recorded at the time of initiating the call to the called party by the calling party and currently streamed to the called party.

5. The communication device of claim 1, wherein the one or more processors causes presentation of the voice message recorded at the time of initiating the call to the called party by the calling party as the alias for the ring tone presented at the audible output device of the communication device.

6. The communication device of claim 1, wherein the one or more processors causes presentation of the voice message obtained at the time of initiating the call to the called party by the calling party interleaved with the ring tone presented at the audible output device of the communication device.

7. The communication device of claim 1, wherein the audible output device and a display coupled to the one or more processors presents the video message obtained at the time of initiating the call to the called party by the calling party as the alias for the ring tone presented at the communication device when receiving the call from the calling party.

8. The communication device of claim 1, wherein the audible output device and a display coupled to the one or more processors presents the video message recorded at the time of initiating the call to the called party by the calling party interleaved with the ring tone presented at the communication device.

9. The communication device of claim 1, further comprising a display coupled to the one or more processors wherein the video message is a photograph taken at the time of initiating the call to the called party by the calling party which is presented as the alias for the ring tone at the communication device when receiving the call from the calling party.

10. The communication device of claim 1, further comprising a display coupled to the one or more processors wherein the video message is a photograph taken at the time of initiating the call to the called party by the calling party which is presented with the ring tone at the communication device in a repeating cycle when receiving the call from the calling party until the call is answered or rejected.

11. The communication device of claim 1, wherein the signaling of the call from the calling party includes caller identification information and wherein the one or more processors execute computer instructions causing the one or more processors to present the caller identification information.

12. A method at a communication device, comprising:
receiving a call from a calling party that includes a voice or video message associated with caller identification information;
presenting via a presentation device the voice message or video message as an alias to a ring tone or interleaved with the ring tone or presented with the ring tone in a repeating cycle until the call from the calling party is answered or rejected; and
analyzing the voice message or the video message and routing the message based on the analysis.

13. The method of claim 12, wherein the presentation device is a speaker, a display, or both.

14. The method of claim 12, wherein the voice or video message is a recorded voice message or a live voice message or a recorded video message or a live video message obtained at the time of initiating the call to the called party by the calling party and currently streamed to the called party at the communication device.

15. The method of claim 12, wherein the method presents the voice message obtained at the time of initiating the call to the called party by the calling party device as the alias for the ring tone presented at the presentation device for the communication device.

16. The method of claim 12, wherein method presents a recorded voice message recorded at the time of initiating the call to the called party by the calling party interleaved with the ring tone or presented in the repeating cycle at the presentation device for the communication device.

17. The method of claim 12, wherein the call from the calling party includes caller identification information and the method further comprises the step of presenting the caller identification information via the presentation device operatively coupled to the communication device.

18. A system for communicating with a communication device that presents a ring tone alias, comprising:
a memory having computer instructions; and
one or more processors operatively coupled to the memory, the execution of the computer instructions causing the one or more processors to perform operations comprising:
originating a call from a calling party to a called party that includes a message having a voice message, or video message or photograph associated with the caller identification information obtained at a time of the call origination;
transmitting the message to the called party for presentation at the communication device of the called party;
wherein the message is presented at the communication device of the called party as an alias to the ring tone or interleaved with the ring tone or presented with the ring tone in a repeating cycle until the call from the calling party is answered or rejected; and
analyzing the message and routing or rejecting the message based on the analysis.

19. The system of claim 18, wherein the system is a telephone communication system for a landline or a mobile phone.

20. The system of claim 18, wherein the call includes caller identification information and wherein the caller identification information is transmitted and presented to the communication device of the called party.

* * * * *